United States Patent
Zhong et al.

(10) Patent No.: US 7,208,439 B2
(45) Date of Patent: Apr. 24, 2007

(54) GOLD-BASED ALLOY NANOPARTICLES FOR USE IN FUEL CELL CATALYSTS

(75) Inventors: Chuan-Jian Zhong, Johnson City, NY (US); Jin Luo, Binghamton, NY (US); Mathew M. Maye, Vestal, NY (US); Nancy N. Kariuki, Binghamton, NY (US)

(73) Assignee: The Research Foundation of State University of New York, Albany, NY (US)

( * ) Notice: Subject to any disclaimer, the term of this patent is extended or adjusted under 35 U.S.C. 154(b) by 39 days.

(21) Appl. No.: 11/051,777

(22) Filed: Feb. 4, 2005

(65) Prior Publication Data

US 2006/0178260 A1    Aug. 10, 2006

(51) Int. Cl.
- *B01J 21/18* (2006.01)
- *B01J 23/40* (2006.01)
- *B22F 1/02* (2006.01)
- *C02C 5/02* (2006.01)
- *H01M 4/00* (2006.01)

(52) U.S. Cl. .......... 502/185; 75/246; 75/247; 420/510; 429/40

(58) Field of Classification Search .......... 502/185; 75/246, 247; 420/510; 429/40
See application file for complete search history.

(56) References Cited

U.S. PATENT DOCUMENTS 3,923,612 A * 12/1975 Wiesner ............ 205/247
5,132,193 A * 7/1992 Reddy et al. .......... 429/13
6,861,387 B2 * 3/2005 Ruth et al. ............ 502/184

FOREIGN PATENT DOCUMENTS

EP           0 557 67 H   *   9/1993

OTHER PUBLICATIONS

Maye, Mathew M. and Zhong, Chuan-Jian, "Manipulating core-shell reactivities for processing nanoparticle sizes and shapes." J. Mater. Chem., 2000, 10, pp. 1895-1901.*

Zhong, Chuan-Jian, and Maye, Mathew M., "Core-Shell Assembled Nanoparticles as Catalysts." Adv. Mater. 2001, 13, No. 19, Oct. 2, pp. 1507-1511.*

* cited by examiner

*Primary Examiner*—J. A. Lorengo
*Assistant Examiner*—Patricia L. Hailey
(74) *Attorney, Agent, or Firm*—Nixon Peabody LLP

(57) ABSTRACT

A method is featured for fabricating Carbon-supported AuPt nanoparticle catalysts for fuel cells, and particularly fuel cells using methanol as the fuel. The method prepares AuPt-based fuel cell catalysts having a wide range of controllable Au:Pt ratios. The AuPt catalysis are supportable on both carbon black (C) and C/TiO$_2$ support materials. These materials demonstrate electro-catalytic activity towards CO and methanol oxidation, and O$_2$ reduction. The same catalyst material is useful in constructing both anodes and cathodes, and demonstrates bifunctional activity.

20 Claims, 15 Drawing Sheets

GOLD-BASED ALLOY NANOPARTICLES FOR USE IN FUEL CELL CATALYSTS

RELATED APPLICATIONS

This application is related to co-pending application Ser. Nos. 10/347,473, filed Jan. 21, 2003; Ser. No. 10/688,055, filed Oct. 20, 2003; and Ser. No. 10/712,595, filed Nov. 13, 2003; all of which are included by reference in their entirety.

FIELD OF THE INVENTION

The invention relates to fuel cell catalysts and, more particularly, to bifunctional gold/platinum (AuPt) anode and cathode nanoparticle catalysts for methanol and hydrogen fuel cell applications.

BACKGROUND OF THE INVENTION

Electrochemical fuel cells convert the chemical energy of fuels directly into electrical energy to provide a clean and highly efficient source of electrical energy. Like a battery, a fuel cell consists of two electrodes (an anode and a cathode) separated by an electrolyte typically made of a thin polymeric membrane. In a typical fuel cell, hydrogen gas from the fuel reacts electrochemically at the anode electrode and is converted into protons and electrons. The protons move through the electrolyte to the other electrode, where they combine with the product from the reduction of oxygen from the air at the cathode to form water, which is expelled from the cell as vapor. The involvement of hydrogen and oxygen in the two reactions—one releasing electrons and the other consuming them—yields electrical energy that is tapped across the electrodes for electrical power.

The high conversion efficiencies and low pollution of fuel cells such as hydrogen and direct methanol fuel cells are becoming increasingly attractive power sources for mobile and stationary applications such as on-board electric power for advanced propulsion systems and generation of non-polluting vehicles. While researchers around the world are developing potential fuel cell applications including electric vehicles and portable electrical power supplies, these developments faces challenging scientific problems in the areas of materials science, interfacial science and catalysis. In proton exchange membrane fuel cells (PEMFCs) hydrogen ions must be transported through a semi permeable membrane, hydrocarbon fuels must be converted to pure hydrogen by reforming, and the overall conversion requires a complex process technology and substantial investments in safety and controls. Direct methanol fuel cells (DMFCs) offer a simpler solution and require no reformer.

Direct methanol fuel cells are increasingly considered as an attractive power source for mobile applications because of the high energy density, the fuel portability, and the easily renewable feature of methanol. The fuel portability of methanol is particularly important in comparison with the difficulties of storing and transporting hydrogen. For methanol oxidation, the binary PtRu nanoparticle catalyst on carbon support is currently one of the most-studied catalysts, and shows a bifunctional catalytic mechanism, in which Pt provides the main site for the dehydrogenation of methanol and Ru provides the site for hydroxide (OH) and for oxidizing CO-like species to $CO_2$.

Two technical concerns retard the use of direct methanol fuel cells. First, currently, the energy density (~2000 Wh/kg) and operating cell voltage (0.4 V) for methanol fuel cells are much lower than the theoretical energy density (~6000 Wh/kg). Second, the thermodynamic potential (~1.2 V) due to poor activity of the anode catalysts and "methanol crossover" to the cathode electrode, leads to a loss of about one-third of the available energy at the cathode and another one-third of the available energy at the anode.

In addition, concerns exist with the use of platinum group metals (PGM) for both anode and cathode catalysts. PGM are quite expensive, and a method of reducing the amount of PGM required in a direct methanol fuel cell will make these cells more commercially attractive. In addition, a major problem with the PGM catalysts is the poisoning of Pt by CO-like intermediate species. On the cathode, the kinetic limitation of the oxygen reduction reaction (ORR) is a problem of interest in proton exchange membrane fuel cells operating at low temperature (<100° C.) and in DMFCs. The rate of breaking O=O bond to form water strongly depends on the degree of its interaction with the adsorption sites of the catalyst, and competition with other species in the electrolyte (e.g., $CH_3OH$). A problem in using Pt as catalyst at the anode is the strong adsorption of OH forming Pt—OH, which causes inhibition of the $O_2$ reduction.

Bimetallic AuPt is a known electro-catalyst for oxygen reduction in alkaline fuel cells. However, there have been few reports for the utilization of AuPt nanoparticles with controllable size and composition in fuel cell catalyst applications. Such a use is important because the metal nanoparticles in the size range of 1 to 10 nm undergo a transition from atomic to metallic properties, and the bimetallic alloy composition produces a synergistic effect. The synergistic catalytic effect involves the suppression of adsorbed poisonous species and the change in electronic band structure to modify the strength of the surface adsorption. With bimetallic Au and Pt systems, Pt functions as main hydrogenation or dehydrogenation sites, and the use of Au together with Pt speeds up the removal of the poisonous CO-like species. Observations of the function of AuPt bulk alloy catalysts include: the decrease of activation energy for facilitating oxidative desorption and suppressing the adsorption of CO; the sufficiently-high adsorptivity to support catalytic oxidation in alkaline electrolytes; the important role of $OH^-_{ads}$ in alkaline medium; and the presence of Au playing a role in reducing the strength of the Pt—OH formation. It has been recently shown that catalysts prepared by impregnation from Pt and Au precursors are similar to those of monometallic Pt catalysts, indicating that the presence of Au did not affect the catalytic performance of Pt in any significant way, because the two metals remain segregated due to their miscibility gap, and only Pt participates in the adsorption of CO and the reactions under consideration. In contrast, catalysts prepared from a AuPt organo-bimetallic cluster precursor exhibited different behavior both in terms of CO adsorption and their catalytic activity, suggesting that Pt and Au remain intimately mixed in the form of bimetallic particles and that the presence of Au modifies the catalytic properties of Pt.

The gold and gold-platinum nanoparticles prepared by two-phase protocol are first assembled on carbon black support materials and then activated by calcination, and finally deposited on planar glassy carbon substrates (electrodes). An initial comparison of the electro catalytic ORR activities of carbon-supported Au and AuPt nanoparticle catalysts with commercially-available Pt/C and PtRu/C catalysts is also made. Co-precipitation, deposition-precipitation, ion-exchange, impregnation, and successive reduction and calcination have been widely used for the preparation of the catalysts (3, 4, 15). The lack of control over size, shape and stability is an inherent disadvantage of these previously known methods of preparation. It is especially difficult to process the nanoparticles once produced. Stabilizing the surface of the nanoparticles by capping them with a shell of organic molecules has been used in the current invention, achieving controllable size, shape, composition, and surface properties of the particles.

The present invention provides "core-shell" assembled gold and gold/platinum nanoparticles to fabricate a new class of catalysts. The present invention provides a method of preparation of these AuPt nanoparticles controlling their size, shape, composition and surface properties. As a result, the nanoparticles are both aggregation resistant and resistant to poisoning by CO-like species typically present in DMFCs.

SUMMARY OF THE INVENTION

In accordance with the present invention, a method of preparing a new class of bifunctional anode and cathode catalysts for fuel cells is described. The prepared catalysts are primarily for electro-oxidation of methanol at the anode and electro-reduction of oxygen at the cathode. The catalysts consist of a bimetallic alloy of gold and platinum (AuPt) core-shell nanoparticles having sizes in the range of approximately 1–5 nm. Core-shell nanoparticles are defined as nanoparticles in which the core and the shell of the particles are of different matter in close interaction, including in this specific case a inorganic core/organic shell combination. Specifically, the AuPt alloy composition ranges from Au:Pt atomic ratios of 1:99 to 99:1. The catalysts are supported on carbon black (C) and on C/$TiO_2$ supports. This method involves: first, the controlled preparation of the alloy nanoparticles which are with an organic layer; second, the assembly or dispersion of the nanoparticles and their adsorption onto non metallic supports, including both carbon black and C/$TiO_2$; third, the controlled activation of the catalysts by thermal or by electrochemical methods; and fourth, the deposition of the supported nanoparticles on planar glassy carbon substrates (electrodes).

In comparison with today's commercial catalysts, this class of catalysts has at least four advantages. First, the catalyst cost is reduced, by the use of a less expensive non-PGM metal, i.e., gold, as an alloying metal, and by the use of nanoparticles of very high surface area to weight ratio, dispersed on a non-noble metal support and substrate. Second, the poisoning effect of the Pt by the CO-like species is eliminated. Third, the catalysts have bi-functional catalytic activity, whereby one alloy constituent provides the main site for the dehydrogenation of methanol and a second alloy constituent provides the site for hydroxide (OH) and for oxidizing CO-like species to $CO_2$. Fourth, the catalysts can be used as both anode and cathode catalysts in fuel cells.

It is an object of the present invention to provide non-metallic supported nanoparticle catalysts of controlled size, for use in fuel cells, such that the catalysts are less expensive than currently used catalysts.

It is yet another object of the present invention to provide catalysts that can be used as both anode and cathode catalysts in fuel cells.

It is another object of the invention to provide nanoparticle catalysts having bi-functional catalytic activity, and to provide increased energy efficiency DMFCs, by comparison with conventional catalysts.

BRIEF DESCRIPTION OF THE DRAWINGS

A complete understanding of the present invention may be obtained by reference to the accompanying drawings, when considered in conjunction with the subsequent detailed description, in which:

FIG. 2b is a graph of particle size distribution of the nanoparticles shown in FIG. 2a;

DESCRIPTION OF THE PREFERRED EMBODIMENT

A method is described for fabricating core-shell nanoparticles comprising a bimetallic alloy of gold and platinum (AuPt), such nanoparticles having controlled sizes in the range of approximately 1–5 nm, whereby such nanoparticles may be used as bifunctional catalysts for fuel cells, and particularly for DMFCs. The method prepares bimetallic AuPt alloy nanoparticles of controlled size, on non-metallic supports and electrically conductive substrates, forming DMFC catalysts. These catalysts have controllable Au to Pt ratios. Supports include carbon black (C) and possibly other non-metallic materials, including Carbon-supported $TiO_2$ (C/$TiO_2$), and the electrically conductive substrates used are materials resistant to chemical degradation, such as glassy carbon electrodes. These catalysts demonstrate efficient electro catalytic activity towards CO and methanol oxidation as well as $O_2$ reduction.

Figure 1A:
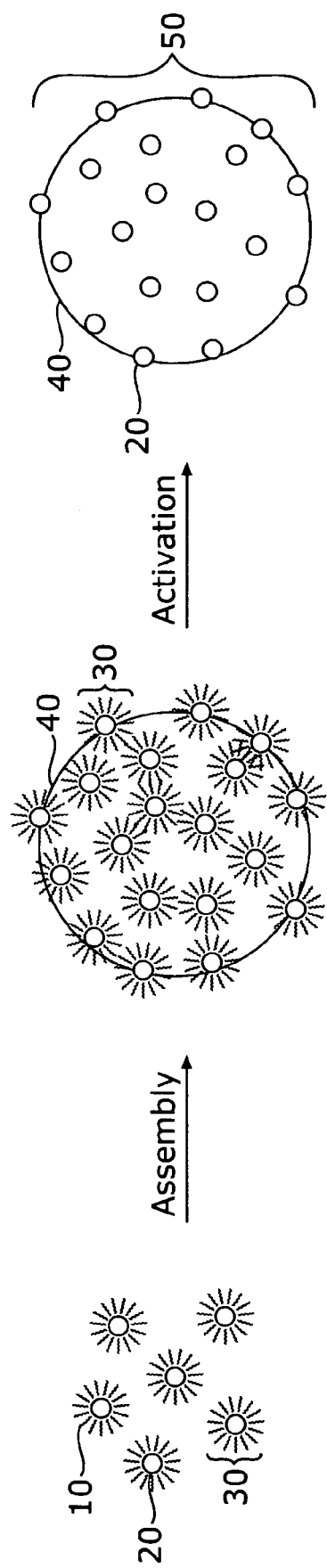
FIG. 1a is a pictorial, schematic diagram of the assembly of core-shell nanoparticles in accordance with the invention.
Figure 1B:
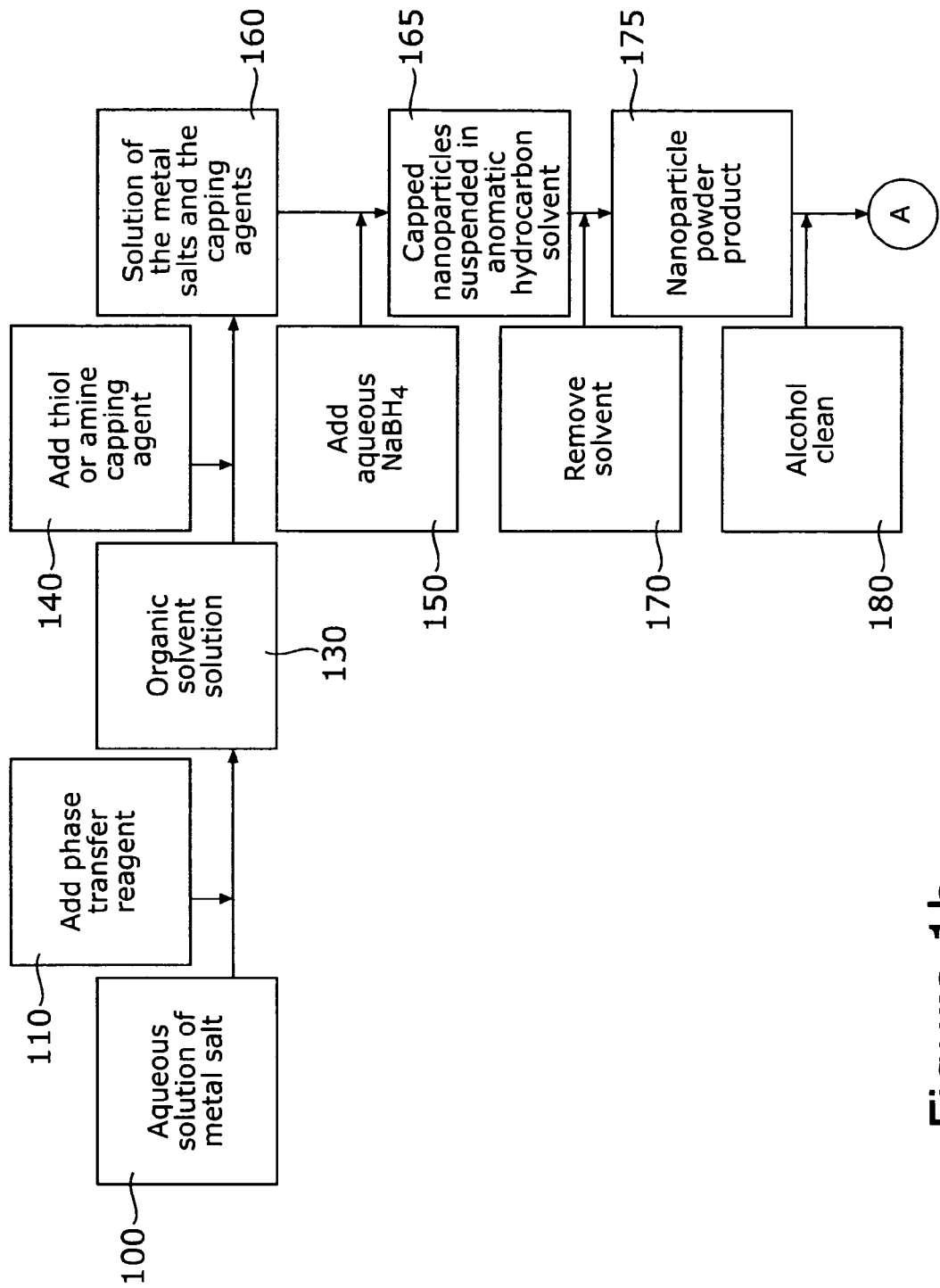
FIGS. 1b, 1c and 1d are a flow chart of the process of the assembly of core-shell nanoparticles in accordance with the invention.
Figure 1C:
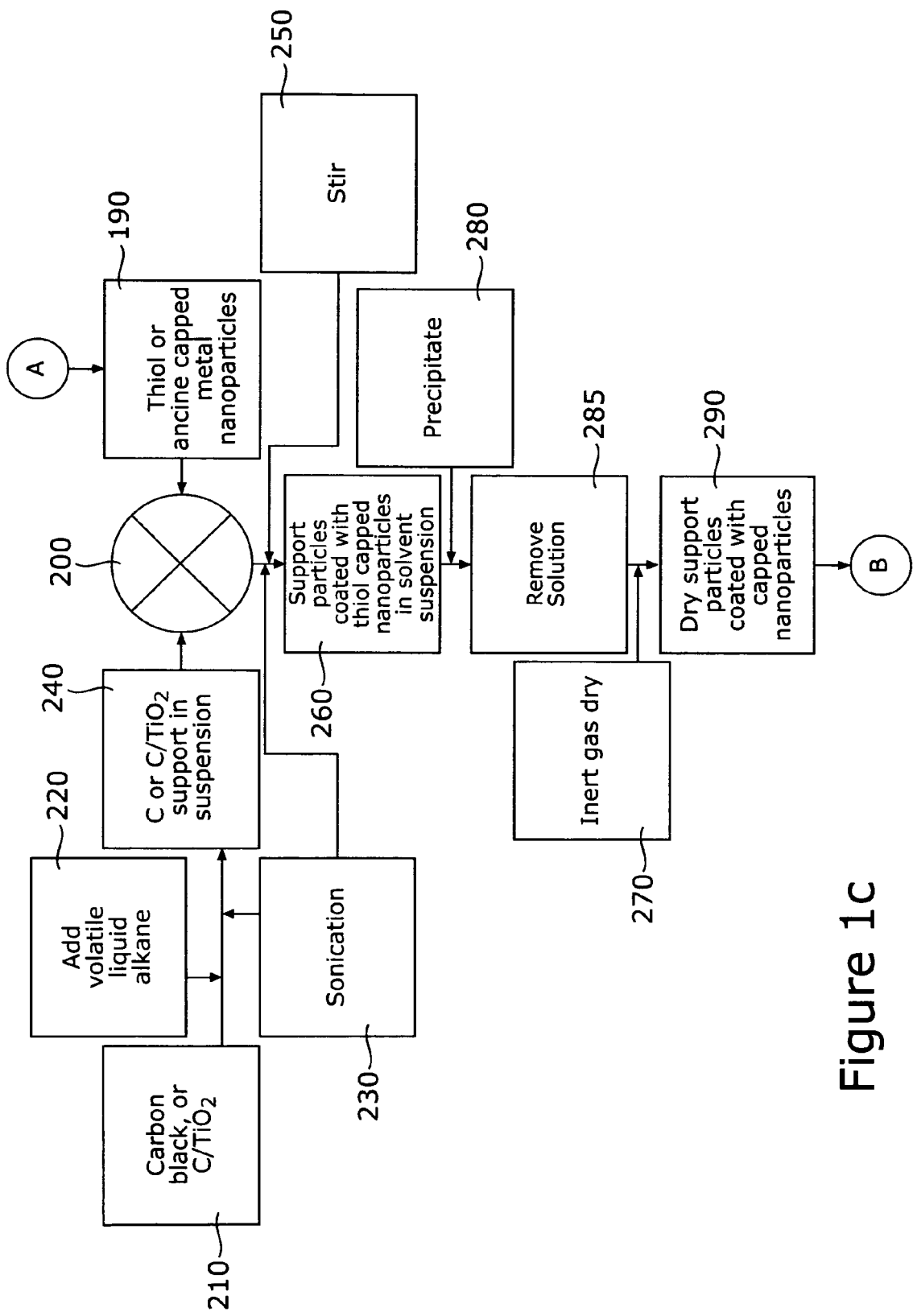
Figure 1D:
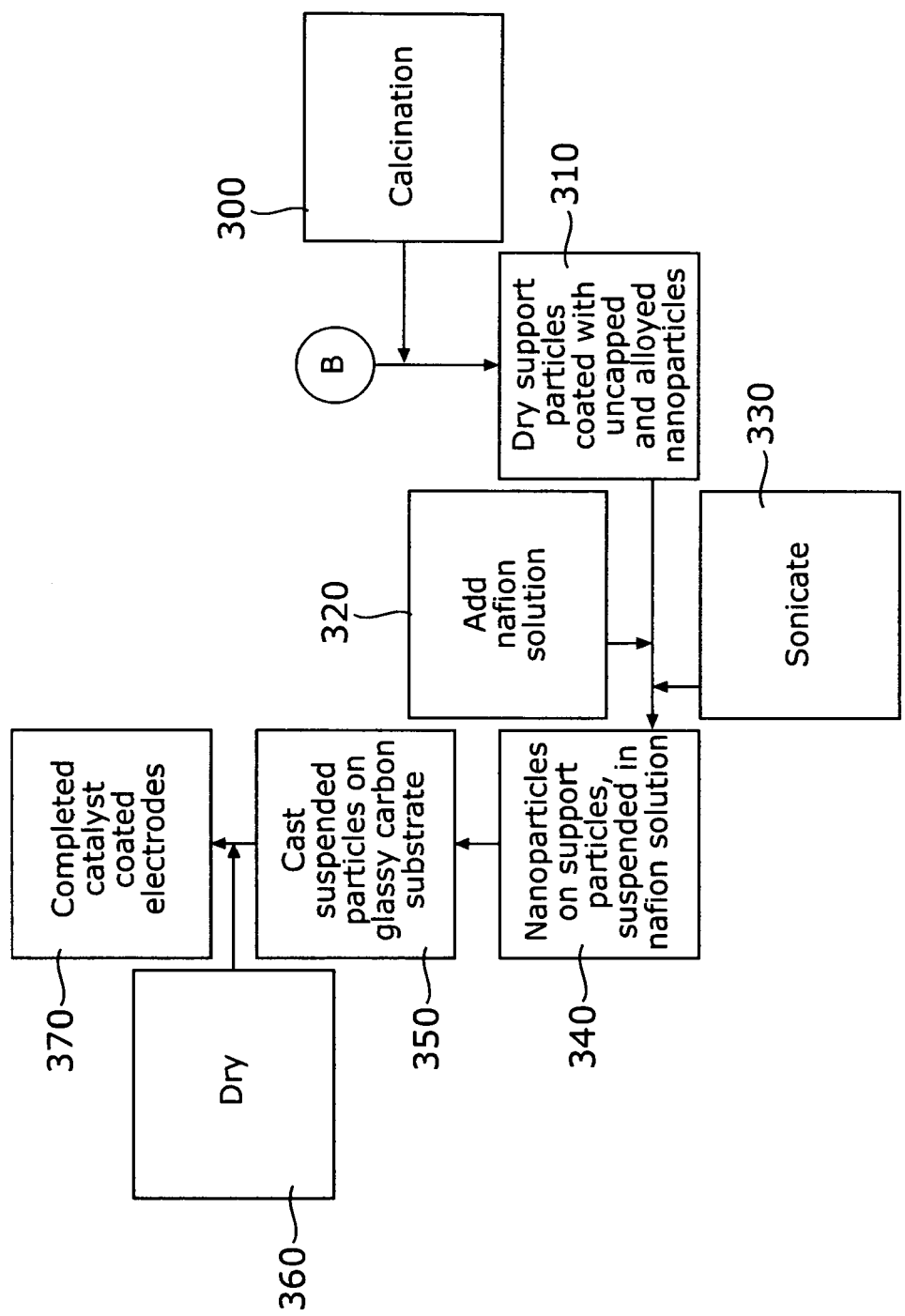

Referring first to FIGS. 1a and 1b, there is shown a pictorial, schematic diagram of the assembly of core-shell nanoparticles (FIG. 1a) and a flowchart of the assembly process (FIGS. 1b, 1c, and 1d). In FIG. 1a, AuPt nanoparticles 20 are capped with thiol 10, forming suspended capped particles 30, a process of molecularly mediation. These capped particles 30 are subsequently assembled, using molecularly mediated assembly, on the surface of support particles 40, which may be carbon black, C, or C/$TiO_2$. The assembled nanoparticles 20 are activated by removal of the thiol cap 10, using calcination, or alternatively by electrochemical polarization, resulting in assembly 50.

In FIGS. 1b, 1c, and 1d, the flowchart of the assembly process, the initial step 100 is selecting a portion of an aqueous solution of the metal salt(s) of interest. In step 110 a phase transfer reagent is added; in step 120 an aromatic hydrocarbon is added, with the result 130 being an organic solvent solution.

A thiol or amine capping agent is added, step 140, to cap the nanoparticles being formed, resulting in a solution of metal salts and capping agents, step 160. Then aqueous NaBh4 is added, step 150, resulting in capped nanoparticles suspended in an aromatic hydrocarbon solvent, step 165. In step 170 the solvent is removed, resulting in nanoparticle powder product, step 175. In step 180 the resulting solids are cleaned with alcohol, resulting in thiol or amine capped metal nanoparticles, step 190.

In step 210 a portion of carbon black, C, or C/$TiO_2$ is selected, to which is added a volatile liquid alkane, step 220, and the resulting solid/liquid mixture is sonicated, step 230, resulting in a C or C/$TiO_2$ support suspended in liquid alkane.

In junction 200 the thiol capped nanoparticles and the support material in alkane suspension are brought together. The resulting solid/liquid mixture is sonicated, step 230, and stirred, step 250, resulting in support particles coated with thiol capped nanoparticles suspended in liquid alkane, step 260. The liquid portion is removed, step 285. The wet solid residue is then dried with inert gas 270, which leaves the precipitate, step 280, behind.

The result, step 290, is dry support particles coated with capped nanoparticles. These are then subjected to calcination, step 300, removing the thiol capping material from the nanoparticles, leaving dry support particles coated with uncapped nanoparticles, step 310.

A Nafion® solution is then added to this dry material, step 320, and the resulting mixture is sonicated, step 330, resulting in a suspension of the solid particles in Nafion solution, step 340. This suspension is then cast on glassy carbon substrates, step 350, which are then dried, step 360, forming the completed catalyst coated electrodes, step 370.

Catalyst Preparation

Gold nanoparticles of 2-nm core size encapsulated with an alkanethiolate monolayer shell (Au) were synthesized by the standard two-phase method. Referring to FIGS. 1b, 1c, and 1d, gold-platinum nanoparticles of 2-nm core size encapsulated with an alkanethiolate monolayer shell (AuPt) were synthesized by a modified two-phase method. Briefly $AuCl_4^-$ and $PtCl_6^{2-}$ were first transferred from aqueous solution of $HAuCl_4$ and $H_2PtCl_6$ into toluene solution using a phase transfer reagent (tetraoctylammonium bromide), steps 100 through 130. Thiol (e.g., decanethiol, DT) or amine (e.g., oleylamine (OAM)) was added to the organic solution at a 4:1 mole ratio (DT/AuPt), and an excess of aqueous $NaBH_4$ (a reducing agent) was slowly added for the reaction, steps 140 through 160. The produced DT- or OAM-encapsulated AuPt nanoparticles were subjected to solvent removal, and cleaned using ethanol, steps 170 and 180. The $Au_{81}Pt_{19}$ and $Au_{68}Pt_{32}$ nanoparticles reported were obtained by controlling the relative feed ratio of $HAuCl_4$ and $H_2PtCl_6$ in synthesis and the post-synthesis cleaning procedure. Note that the subscripts in the Au:Pt represent the atomic percentage of each metal.

As a typical example, $AuCl^{4-}$ and $PtCl_6^{2-}$, were first transferred from aqueous solutions of $HAuCl_4$ (0.64 g) and $H_2PtCl_6$ (0.66 g), step 100, into a toluene solution using a phase transfer reagent (tetraoctylammonium bromide), steps 110 and 120. Thiols (1.4 mL decanethiol, DT) or alternatively amine compounds (e.g., oleylamine, OAM) were added to the organic solution, step 140, and an excess of aqueous sodium borohydride $NaBH_4$ (2.0 g) was slowly added for the reaction, step 150. The produced DT/OAM-encapsulated AuPt nanoparticles in toluene, step 160, were precipitated by evaporation, step 170, removing the toluene solvent, and cleaned using ethanol, step 180. The precipitated product was collected and suspended in hexane, step 200.

The composition was analyzed using the Direct Current Plasma—Atomic Emission Spectrometric method. Measurements were made on emission peaks at 267.59 nm and 265.95 nm, for Au and Pt, respectively. The nanoparticle samples were dissolved in concentrated aqua regia, and then diluted to concentrations in the range of 1 to 50 ppm for analysis. Calibration curves were made from dissolved standards with concentrations from 0 to 50 ppm in the same acid matrix as the unknowns. Detection limits, based on three standard deviations of the background intensity, are 0.008 ppm and 0.02 ppm for Au and Pt. Standards and unknowns were analyzed 10 times each for 3 second counts. Instrument reproducibility, for concentrations greater than 100 times the detection limit, results in <±2% error.

Again referring to FIGS. 1b, 1c and 1d, for the assembly of the nanoparticles on carbon support, electrically conductive carbon black was first pretreated by suspending in hexane and sonicated for ~6 hours at room temperature, steps 210 through 240. A controlled amount of Au or AuPt molecularly capped nanoparticles was added into the suspension, step 200. The suspension was sonicated for 30 min, followed by stirring overnight, steps 230 and 250. The product (molecularly mediated assembly of Au or AuPt supported on carbon) was precipitated, by drying under $N_2$ and was then collected, steps 270 and 280. The loading of Au or AuPt on carbon support was controlled by the weight ratio of Au or AuPt nanoparticles vs. carbon black. The actual loading of metals was determined by thermogravimetric analysis (TGA) and DCP analysis.

The carbon-loaded nanoparticle catalysts were treated in a tube-furnace under controlled temperatures and atmospheres, step 300. A typical protocol included shell removal by heating at 200–300° C. under approximately 15–30% $O_2/N_2$ for between approximately 0.5–2 hours and calcination at 300–600° C. under approximately 5–20% $H_2/N_2$ for approximately 0.5–4 hours. Alternatively, the assembled nanoparticles may be electrochemically polarized at approximately +700 mV. The carbon-loaded Au or AuPt nanoparticles are denoted as Au/C or AuPt/C.

Electrode Preparation

Glassy carbon (GC) disks (geometric area: 0.07 cm$^2$ for cyclic voltammetric measurement and 0.20 cm$^2$ for rotating disk electrode measurement) were polished with 0.03 μm $Al_2O_3$ powders. A typical suspension of the catalysts was prepared by suspending 1 mg catalysts (Au/C or AuPt/C) in 1 ml 0.25% Nafion® solution, and sonicated for 15 minutes, steps 320 and 330. Nafion material is an example of a poly(tetrafluoroethylene)-based ionomer. Nafion is a perfluorinated polymer that contains small proportions of sulfonic or carboxylic ionic functional groups. Nafion has applications in liquid and gas separations, fuel cells, and the chlor-alkali industries, primarily because of its thermal and chemical resistance, ion-exchange properties, selectivity, mechanical strength, and insolubility in water. The suspension was stable for days. The suspension was then quantitatively transferred to the surface of the polished GC disk, step 350. The electrodes were dried overnight at room temperature, step 360.

Figure 2A:
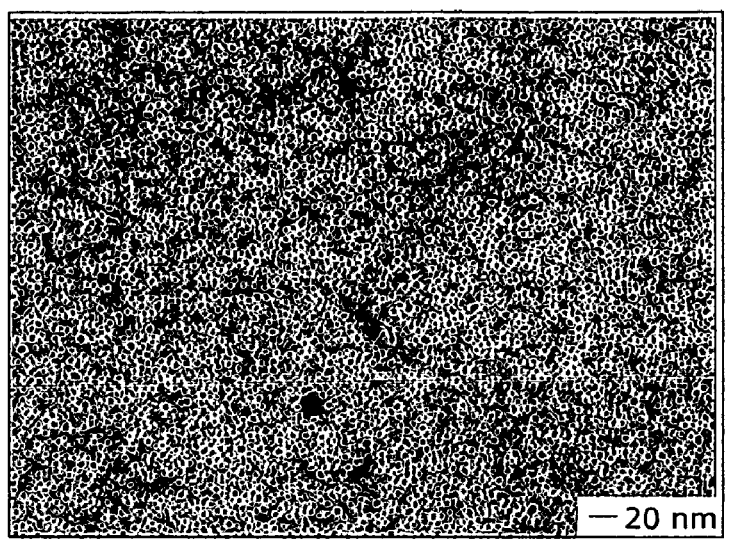
FIG. 2a is a transmission electron microscope (TEM) micrograph of $Au_{82}Pt_{18}$ decanethiol capped nanoparticles.
Figure 2B:
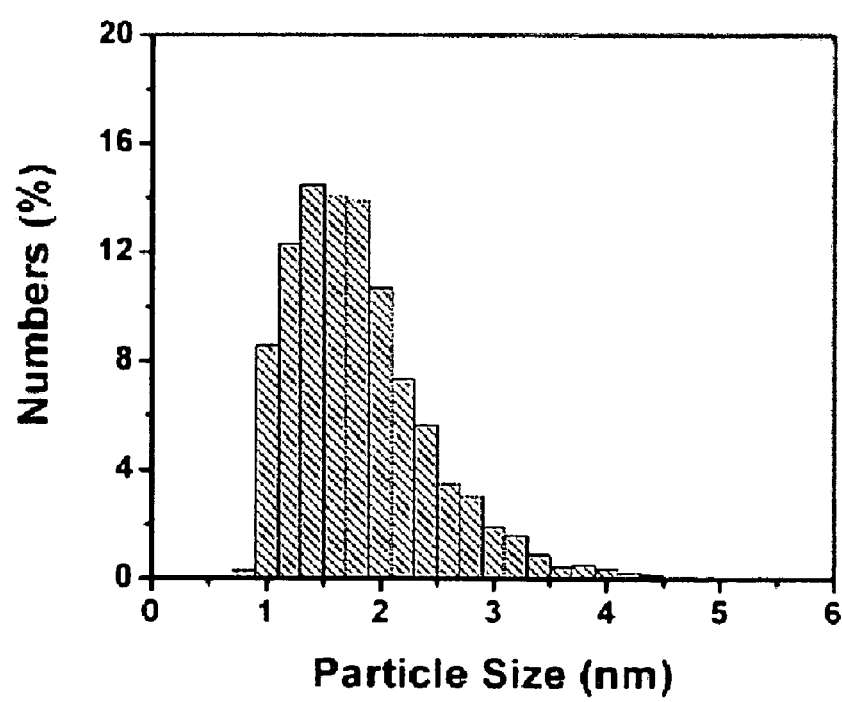

Now referring to FIGS. 2*a* through 2*d,* there are shown representative transmission electron microscope (TEM) micrographs of the nanoparticles produced in accordance with the present invention, capped with decanethiol, supported on carbon black, and after calcination. Specifically, FIG. 2*a* shows a representative TEM micrograph and size distribution for the decanethiol-capped $Au_{82}Pt_{18}$ nanoparticles. The nanoparticles display an average size of 1.8 nm with a relatively high monodispersity (±0.6 nm), as shown in FIG. 2*b*. As evidenced by the uniform interparticle spacing, the particles are individually-isolated by the capping monolayer, which is also shown by FTIR detection of vibrational bands characteristic of the capping molecules.

Figure 2C:
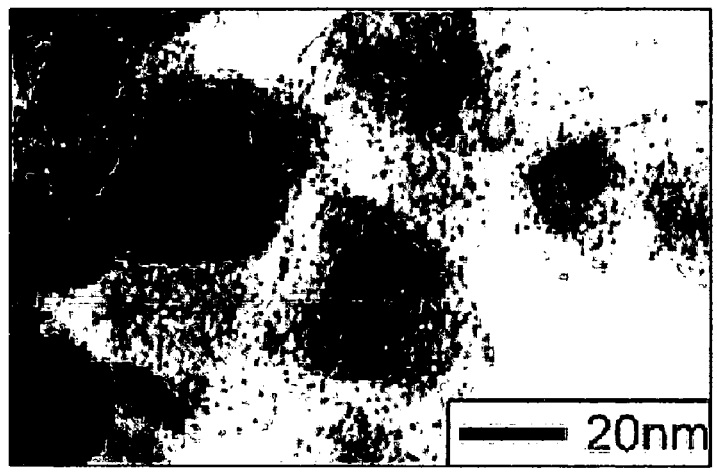
FIG. 2c is a TEM micrograph of $Au_{82}Pt_{18}$ nanoparticles on a carbon black substrate.

Upon loading $Au_{82}Pt_{18}$ nanoparticles onto carbon black ($Au_{82}Pt_{18}$/C, 20% wt loading), a very good dispersion was observed, as shown in FIG. 2*c*. Importantly, the average size of the particles showed little change, suggesting the capping shells remain intact and are responsible for the interaction with the carbon surfaces.

Figure 2D:
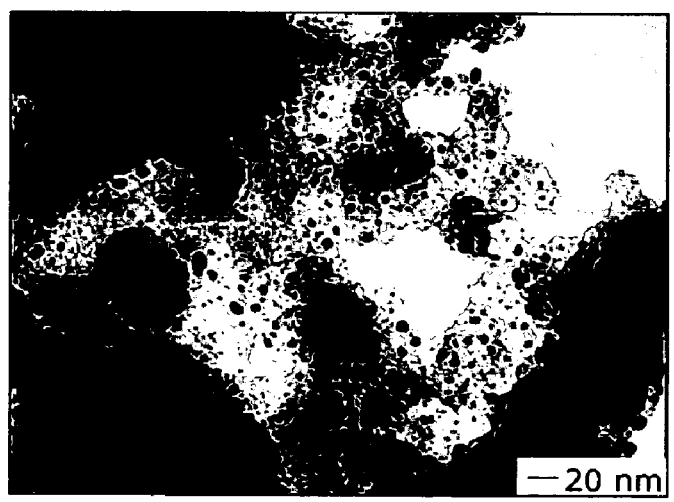
FIG. 2d is a TEM micrograph of the nanoparticles of FIG. 2c after calcination.
Figure 3:
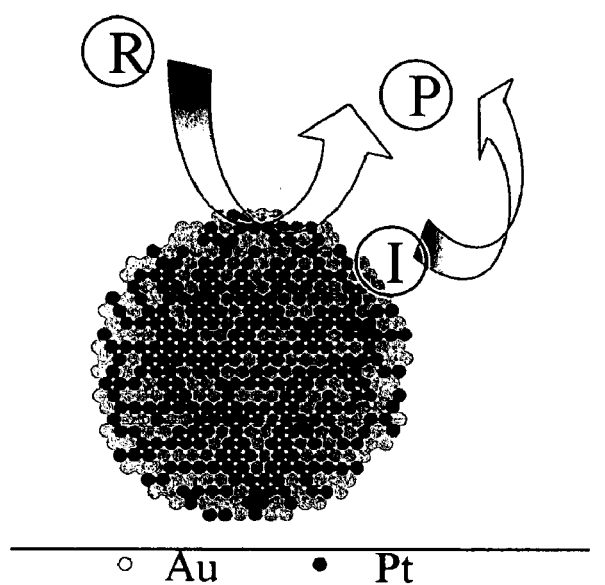
FIG. 3 is a schematic illustration of AuPt nanoparticle catalyst and the catalytic reactions on the surface involving adsorption, interfacial reaction, and desorption of reactant (R), intermediate (I) and product (P)

The calcination treatment involved heating the catalyst at approximately 200–300° C. under approximately 15–30% $O_2$ followed by calcination at 300° C.–600° C. under 5–20% $H_2$. After the calcination treatment of $Au_{82}Pt_{18}$/C, the particle dispersion remains relatively high, but the average size is found to increase by a certain degree that is dependent on the calcination temperature, as shown in FIG. 2*d*. The average size of $Au_{82}Pt_{18}$ nanoparticles increased to 3.3±1.1 nm and to 3.9±1.1 nm after the treatments at 400° C. and 500° C., respectively.

Measurements

The cyclic voltammetry and rotating disk electrode measurements were performed at room temperature. All experiments were performed in three-electrode electrochemical cells. All electrolytic solutions were deaerated with high purity argon or nitrogen before the measurement. The concentration of methanol was 0.5 M. All potentials are given with respect to the reference electrode of Ag/AgCl saturated KCl. The cyclic voltammetric measurements were performed by using a microcomputer-controlled potentiostat (Model 273, PARC). The rotating disk electrode (RDE) measurements were performed using a rotating disk electrode measurement system (Model AFCBP1, Pine Instrument).

Results and Conclusions

The discussion of results includes first a description of the MOR electro-catalysis, and second a description of the ORR electro-catalysis. In each part, the results obtained for Au/C are followed by the results for AuPt/C. Also, the catalytic activities of the catalysts of the current invention are compared with commercially available conventional Pt/C and PtRu/C catalysts, obtained from E-TEK. Cyclic voltammetric data were used to assess the catalytic activity. Similar data assessment has recently been reported for PtRu/C catalysts.

Part 1.

Figure 4:
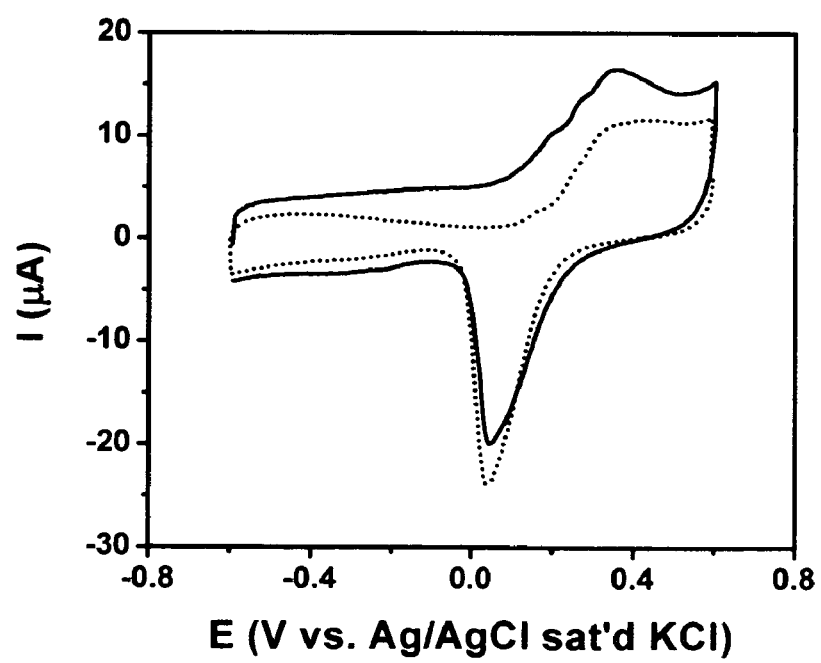
FIG. 4 are cyclic voltammetric curves for a 17% Au/C catalyst (on GC electrode, 0.07 $cm^2$) in alkaline (0.5 M KOH) electrolytes with (solid curves) and without (dash curves) 0.5 M methanol. Scan rate: 50 mV/s.

1. Au/C. FIG. 4 shows a typical cyclic voltammetric (CV) curve of Au/C catalysts (17% (wt) metals) for methanol oxidation (0.5 M) in alkaline electrolyte (0.5 M KOH). In comparison with the CV curve obtained in the absence of methanol where the gold oxidation-reduction waves are evident (dashed line), the observed increase in the anodic current at ~0.30 V and decrease in cathodic current at 0.05 V are indicative of the oxidation of methanol by the Au catalyst. In terms of peak potentials, the catalytic activity is comparable with those observed for Au nanoparticles directly assembled on GC electrode after electrochemical activation.

Note however that measurement of the carbon-supported gold nanoparticle catalyst did not reveal any significant electro-catalytic activity for MOR in acidic electrolyte. This observation is consistent with those reported earlier for gold nanoparticles supported on planar electrode surfaces. The results thus indicate that Au nanoparticle catalysts are active only in the presence of hydroxides.

Figure 5A:
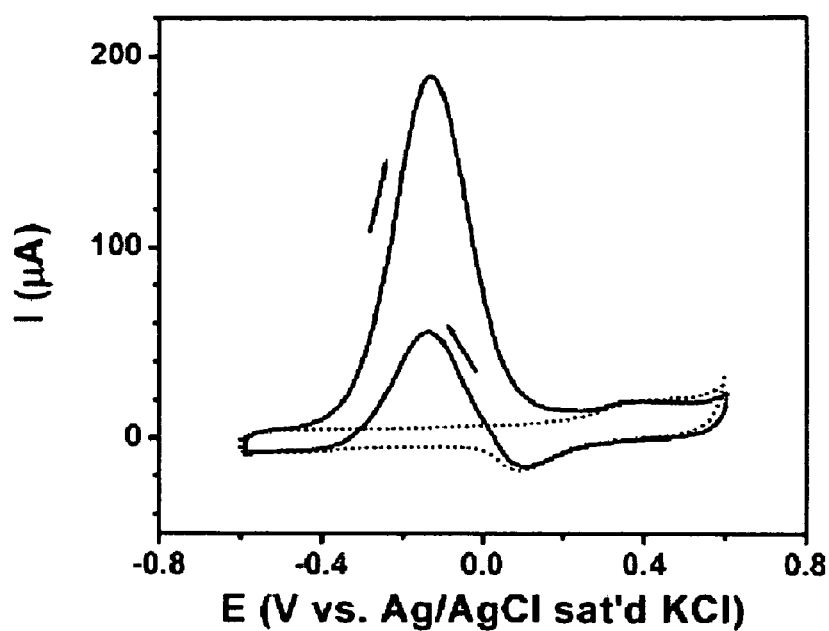
FIGS. 5a and 5b are cyclic voltammetric curves for a 24% $Au_{81}Pt_{19}$/C catalyst (5a) and a 39% $Au_{68}Pt_{32}$/C catalyst (5b) (on GC electrode, 0.07 $cm^2$) in 0.5 M KOH electrolyte with (solid curves) and without (dash curves) 0.5 M methanol. Scan rate: 50 mV/s.
Figure 5B:
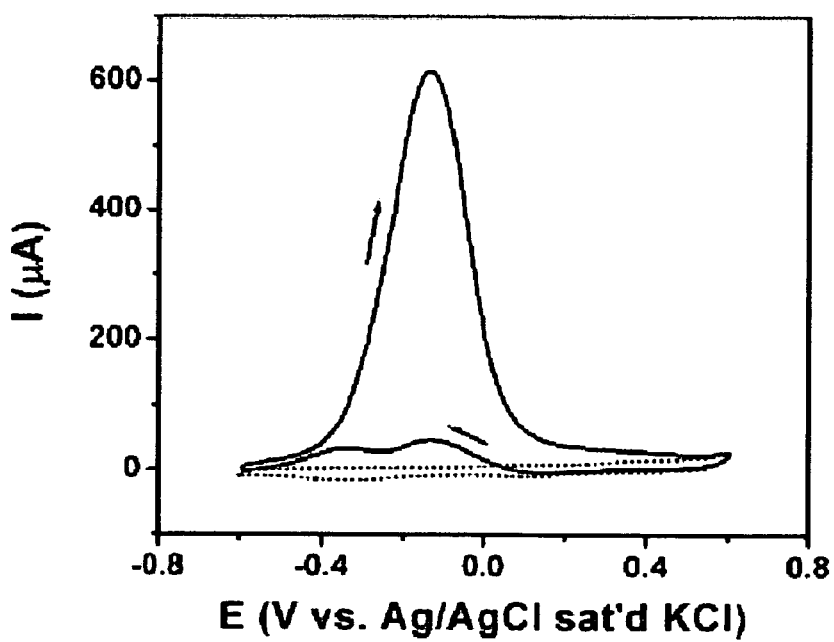

2. AuPt/C. FIGS. 5*a* and 5*b* show a typical set of CV curves obtained for methanol oxidation at AuPt/C catalysts of two different bimetallic compositions in alkaline electrolyte. One composition is $Au_{81}Pt_{19}$/C catalyst with 24% metals loading, FIG. 5*a*, and the other is $Au_{68}Pt_{32}$/C with 39% metals loading, FIG. 5*b*.

In comparison with the data from the control experiment (dashed lines), there is a large anodic wave at −0.13 V, corresponding to the oxidation of methanol. This peak potential is clearly shifted negatively by about 500 mV in comparison with that observed for an Au/C catalyst. The magnitude of the anodic current increases with an increase in the relative Pt composition of the AuPt nanoparticles. Furthermore, a smaller anodic wave is observed at the same potential on the reverse sweep for the $Au_{81}Pt_{19}$/C catalyst, arising from the oxidation of methanol on re-activated catalyst surface.

For the $Au_{68}Pt_{32}$/C catalyst, the anodic wave on the reverse sweep is apparently split into two much smaller waves at −0.13 V and −0.35 V, respectively. Note also that peak splitting for the anodic wave was observed for AuPt nanoparticles directly assembled on GC electrode surface, which is attributed to the phase segregation of the two metals. For example, with 1,9-nonanedithiol(NDT)-linked AuPt nanoparticles assembled on a planar glassy carbon electrode after thermal activation, two anodic waves were observed for methanol oxidation. These two waves, A (0.28 V) and B (−0.08 V), correspond to the reaction sites of Au and Pt, respectively. The current density for wave-B was found to increase with the relative amount of Pt component. In this case, the two metal components in the nanoparticles are likely phase-segregated, which are in contrast to the bimetallic composition for the AuPt nanoparticles supported on carbon black materials. The observation of the single anodic wave character in the forward sweep and the differences in the reverse sweep likely reflect a cooperative bimetallic effect of the AuPt nanoparticles on the catalytic reaction.

Figure 6:
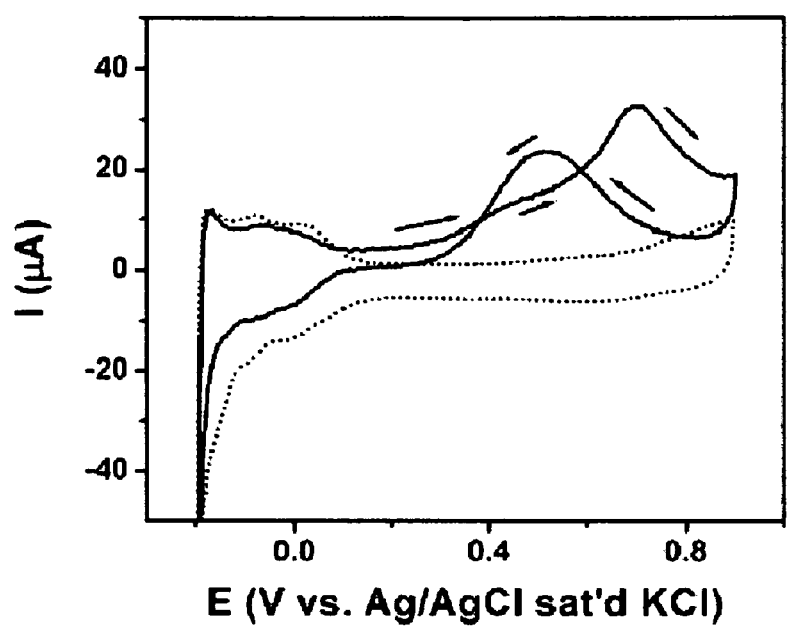
FIG. 6 are cyclic voltammetric curves for a 39% $Au_{68}Pt_{32}$/C catalyst (on GC electrode, 0.07 $cm^2$) in 0.5 M $H_2SO_4$ with (solid curve) and without (dash curve) 0.5 M methanol. Scan rate: 50 mV/s.

In acidic electrolyte, the catalytic activity is found to be highly dependent on the alloy composition. For example, while the $Au_{81}Pt_{19}/c$ catalyst showed little activity, the $Au_{68}Pt_{32}/C$ catalyst showed clear catalytic activity. FIG. 6 shows a typical CV curve obtained for methanol oxidation at the $Au_{68}Pt_{32}/C$ (39% metals) catalyst in an acidic electrolyte. In comparison with data from the control experiment (dashed line), there are two important findings. First, in the 0.2~0.8 V potential range, an anodic wave at 0.7 V is evident, which corresponds to the oxidation of methanol. In the reverse sweep, the anodic wave is observed at a less positive potential (+0.5 V), arising from the oxidation of methanol on re-activated catalyst surface. Secondly, in the −0.2 V~0.1 V potential range, the features characteristic of hydrogen adsorption waves and hydrogen evolution current characteristic of Pt component is clearly modified by the presence of Au component. These two findings indicate that the operation of the bimetallic composition of the AuPt nanoparticles in the electro-catalytic reaction.

3. Comparisons of Electro-catalytic Activities. The above electrochemical data are compared with those from commercially-available catalysts, namely E-TEK's Pt and PtRu catalysts. For the comparison with Au/C and AuPt/C catalysts, as disclosed in the current invention, the commercially available Pt/C and PtRu/C, E-TEK's 20% Pt/C and 20% PtRu/C catalysts, have been examined under the same condition. CV curves for methanol oxidation at E-TEK's 20% Pt/C and 20% PtRu/C catalysts in both alkaline and acidic electrolytes were examined. Based on the characteristics of the anodic waves, the basic electro-catalytic activity of 20% PtRu/C is largely similar to that for the 20% Pt/C catalyst, except for subtle differences in magnitude of the peak current. In the data for the commercially available catalysts, characteristics qualitatively similar to those observed for the AuPt/C catalysts have been noted. There are however important differences upon a close examination. For the anodic waves of MOR, observed differences on the reverse sweeps in terms of the relative peak potential and current were seen. The re-activation of the surface catalytic sites after the anodic sweep is likely modified by the presence of Au in the catalyst, which leads to the shift of the peak potential to a more positive potential. For the hydrogen adsorption/reduction voltammetric characteristics, changes in peak shapes and relative currents of the adsorption/desorption and the bulk reduction waves were observed. This observation again reflects the surface modification of the catalysts by the presence of Au. For a quantitative comparison of the data, the peak current vs. the amount of catalysts loaded onto the electrode surface has also been measured. The result displays basically a linear relationship. This indicates comparability of data because the catalysts loading of Au/C and AuPt/C on the electrode surface fall in the linear range. Table 1 summarizes the above data for the different catalysts.

TABLE 1

Comparison of MeOH (0.5 M) oxidation peak potential ($E_{pa}$) and peak current ($i_{pa}$).

| Catalyst | Wt % Mt Wt % | $M_1$:$M_2$ Ratio | 0.5 M KOH | | 0.5 M $H_2SO_4$ | |
| --- | --- | --- | --- | --- | --- | --- |
| | | | $E_{pa}$ mV | $I_{pa}$ | $E_{pa}$ mV | $I_{pa}$ |
| Pt/C[E] | 20% Pt | | −179 (Rev. 390) | 8875 | +645 (Rev. 458) | 3304 |
| PtRu/C[E] | 20% PtRu | PtRu | −248 (Rev. 438) | 7643 (Rev. 652) | +644 (Rev. 502) | 1250 (Rev. 659) |
| Au/C | 17% Au | | +357 | 349 | — | — |
| AuPt/C | 24% AuPt | $Au_{81}Pt_{19}$ | −131 (Rev. −137) | 2820 | ~+609 | ~113 |
| AuPt/C | 39% AuPt[a] | $Au_{68}$:$Pt_{32}$ | −136 (Rev. −127) | 5643 | +693 (Rev. 521) | 304 |

Electrode coverage: 57 μg catalyst/$cm^2$; Rev.: reversed scan; Electrode area: 0.07 $cm^2$; Scan rate: 50 mV/s; Ref electrode: Ag/AgCl, Sat'd KCl.

While the comparison is preliminary at this stage because based on only limited sets of bimetallic compositions and metal loading for the Pt/C, PtRu/C, Au/C and AuPt/C catalysts, nevertheless, the comparison provides valuable information for an initial assessment of the alloy catalysts of the current invention. By comparing peak potentials and peak currents, two important preliminary conclusions are reached. First, both peak potential and current for the electro-catalytic oxidation of methanol are significantly affected by the alloy composition in the alkaline electrolyte. The peak potentials for the AuPt nanoparticles are slightly higher than that for the Pt/C (by ~+40 mV) and that for the PtRu/C (by ~+100 mV). The peak current density of the AuPt, after being normalized to the total metal loading, is smaller than both of the commercially available catalysts by a factor of 2–3. This observation indicates that there is a major enhancement in comparison with that of Au/C catalysts in terms of the peak potential (by ~−500 mV) and the peak current (by ~20×). The presence of a small fraction of Pt in the Au-based bimetallic nanoparticles significantly modified the catalytic properties.

Second, the display of a significant electro-catalytic activity for MOR at the AuPt/C catalysts in the acidic electrolyte has been observed. This observation is in sharp contrast to the little activity observed for Au/C. Depending on the relative composition of Pt component in the bimetallic nanoparticles, the peak potential is only slightly lower or higher than the Pt/C or PtRu/C catalysts (by −30 ~+50 mV). Note however that the peak current is less by a factor of 10~20 (depending on the Pt composition) than the Pt/C or PtRu/C catalysts. It is thus clear that the bimetallic AuPt composition plays a significant role in the observed modification of the catalytic properties.

As stated earlier, the catalytic modification of the bimetallic composition is in fact further reflected by the remarkable difference of the voltammetric characteristic observed in the reverse scan, especially in the alkaline electrolyte. For Pt/C and Pt/Ru/C, the reverse wave for alkaline electrolyte occurs at a potential less positive than the forward wave by ~200 mV. In contrast, the reverse wave for the AuPt/C occurs at essentially the same potential as for the wave in the forward sweep. The relative peak current of the reverse/forward wave is also found to be dependent on Au % in the bimetallic nanoparticle. The oxides formed on the catalyst surface at the potential beyond the anodic peak potential in the positive sweep are reduced in the reverse sweep. Poisonous CO species formed on Pt surface can also be removed in the reversed sweep. As such, the observation of the more positive potential for the reverse wave likely reflects the bimetallic effect on the re-activation of the catalyst surface after the anodic sweep, a scenario that is under further investigation using spectroscopic techniques.

Part 2.

Figure 7A:
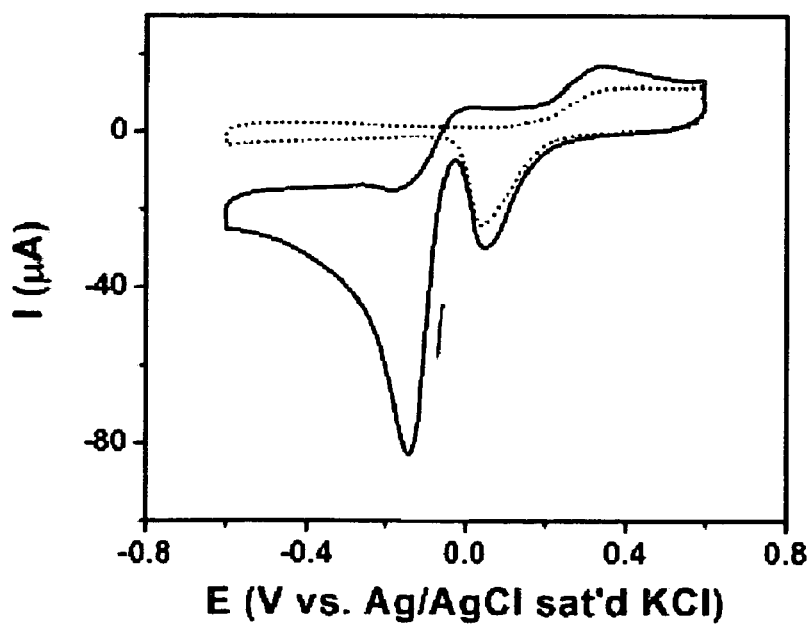
FIGS. 7a and 7b are cyclic voltammetric curves for a Au/C catalyst (17% wt) on GC electrode (0.07 $cm^2$) in alkaline (7a, 0.5 M KOH) and acidic (7b, 0.5 M $H_2SO_4$) electrolytes saturated with $O_2$ (solid curves) and Ar (dash curves). Scan rate: 50 mV/s.
Figure 7B:
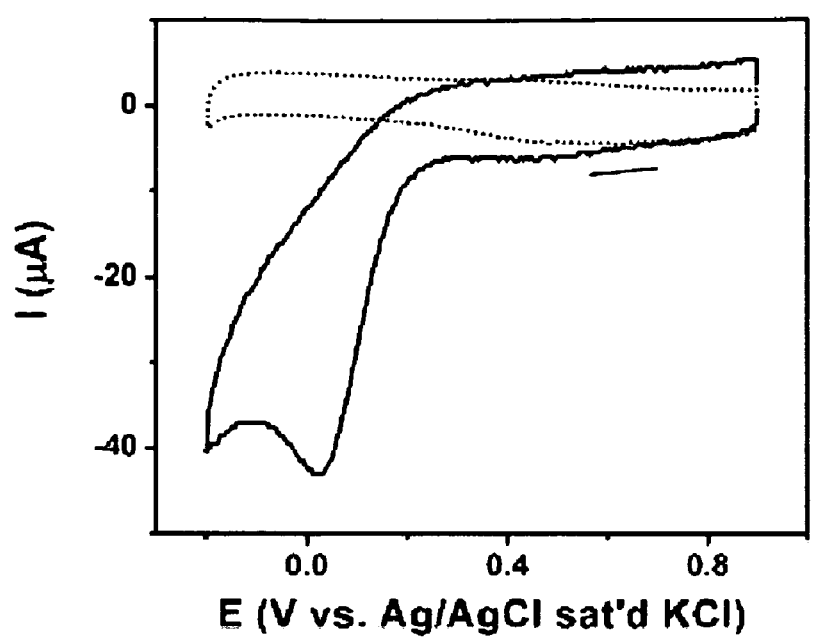

1. Au/C. FIGS. 7a and 7b show a typical set of cyclic voltammetric (CV) curves for ORR at Au/C catalyst (17% wt metal) in 0.5 M KOH (FIG. 7a), and 0.5 M $H_2SO_4$ (FIG. 7b), electrolytes saturated with $O_2$. The CV curves in the absence of oxygen are included as a dashed line for comparison. The blanks reveal an oxidation-reduction wave of gold oxide at ~+200 mV in the alkaline electrolyte but little redox current in the acidic electrolyte. In contrast, the appearance of the cathodic wave is observed at −150 mV in the alkaline electrolyte and at +50 mV in the acidic electrolyte. This finding indicates that the Au catalyst is active towards $O_2$ reduction in both electrolytes.

Figure 8A:
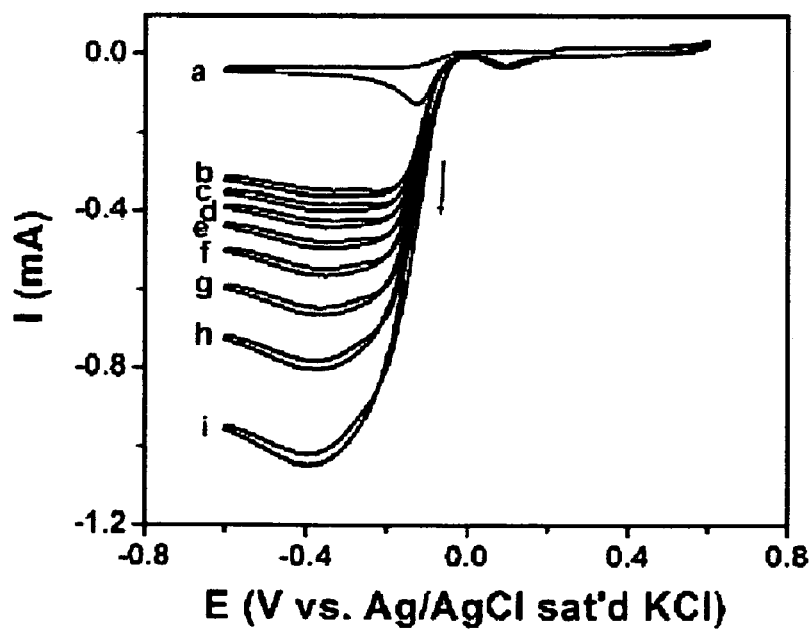
FIGS. 8a, 8b, and 8c are (8a) RDE curves for a Au/C catalyst (17% wt) on GC electrode (0.2 $cm^2$) in the alkaline (A, 0.5 M KOH) electrolyte saturated with $O_2$. (Rpm: (a) 0; (b) 400; (c) 500; (d) 630 (e) 820; (f) 1110; (g) 1600; (h) 2500; (i) 4500. Scan rate: 20 mV/s), and Levich plots (8b and 8c) of the limiting currents in the alkaline (B, 0.5 M KOH) and acidic (C, 0.5 M $H_2SO_4$) electrolytes with saturated with $O_2$.
Figure 8B:
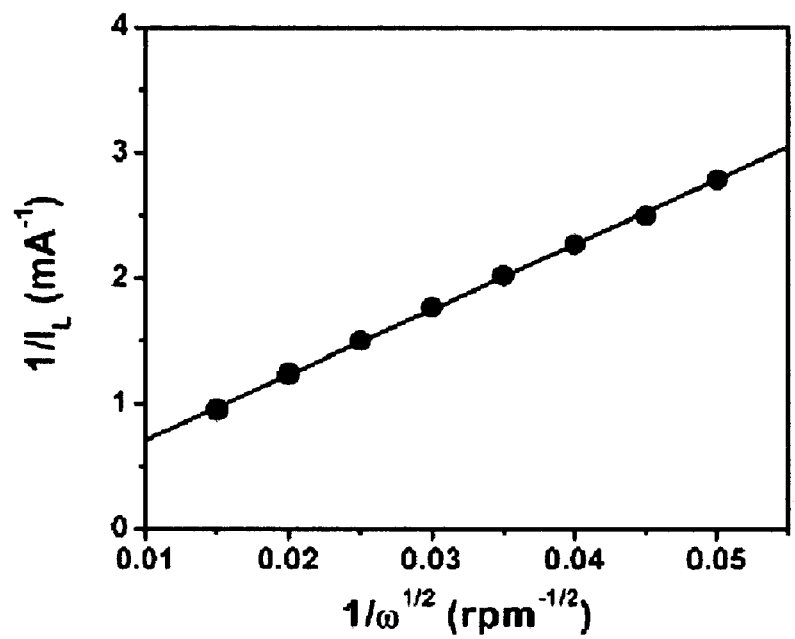
Figure 8C:
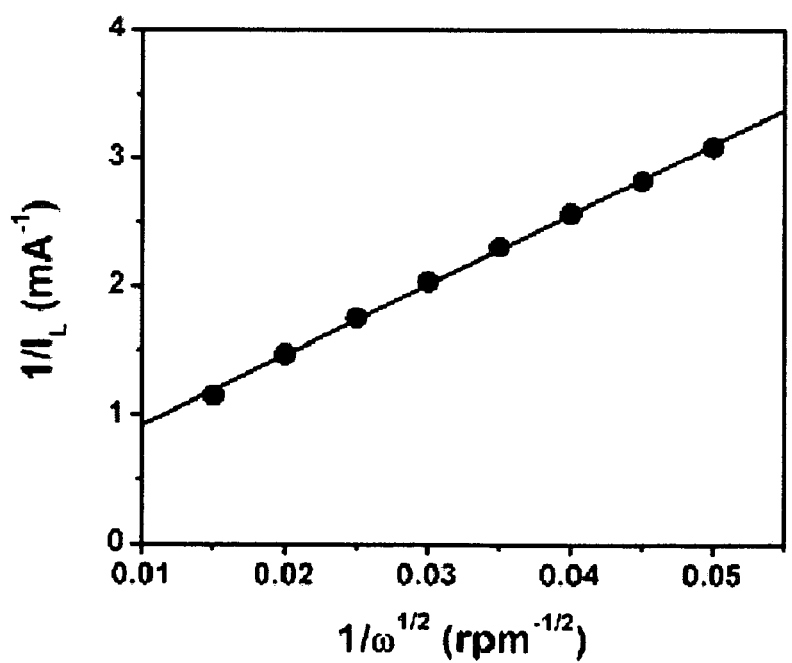

FIGS. 8a, 8b, and 8c show two representative sets of RDE data for further assessing the ORR activities in the above two systems (FIG. 8a). From Levich plots of the limiting current vs. rotating speed data (FIGS. 8b and 8c), one can derive the electron transfer number (n). The electron transfer number obtained was n=3.1 for ORR in 0.5 M KOH electrolyte, and 2.9 for ORR in 0.5 M $H_2SO_4$ electrolyte. The error bar was ±0.2. The intermittent n-value between 2 and 4 indicates that the electro catalytic ORR at the Au/C catalyst likely involved mixed $2e^-$ and $4e^-$ reduction processes.

Figure 9A:
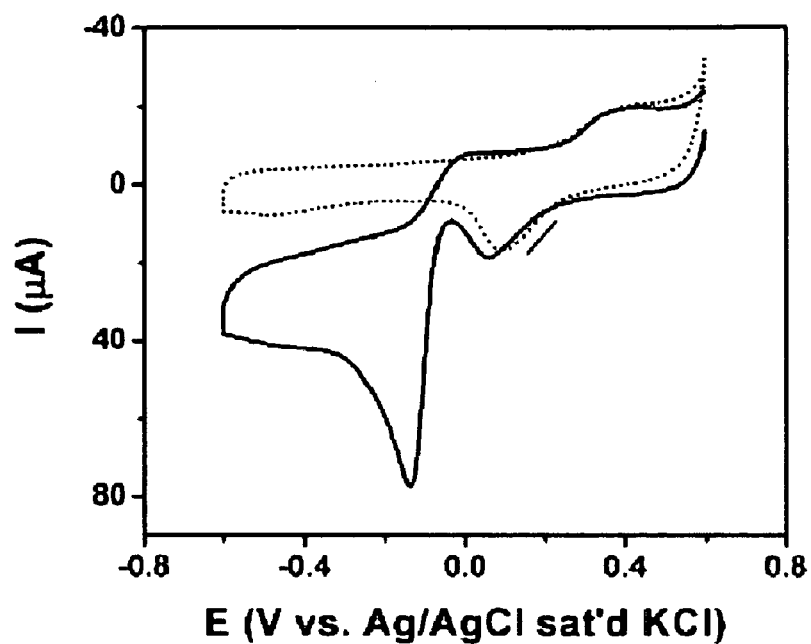
FIGS. 9a and 9b are cyclic voltammetric curves for a $Au_{81}Pt_{19}$/C catalyst (24% wt) on GC electrode (0.07 $cm^2$) in alkaline (A, 0.5 M KOH) and acidic (B, 0.5 M $H_2SO_4$) electrolytes saturated with $O_2$ (solid curves) and Ar (dash curves). Scan rate: 50 mV/s.
Figure 9B:
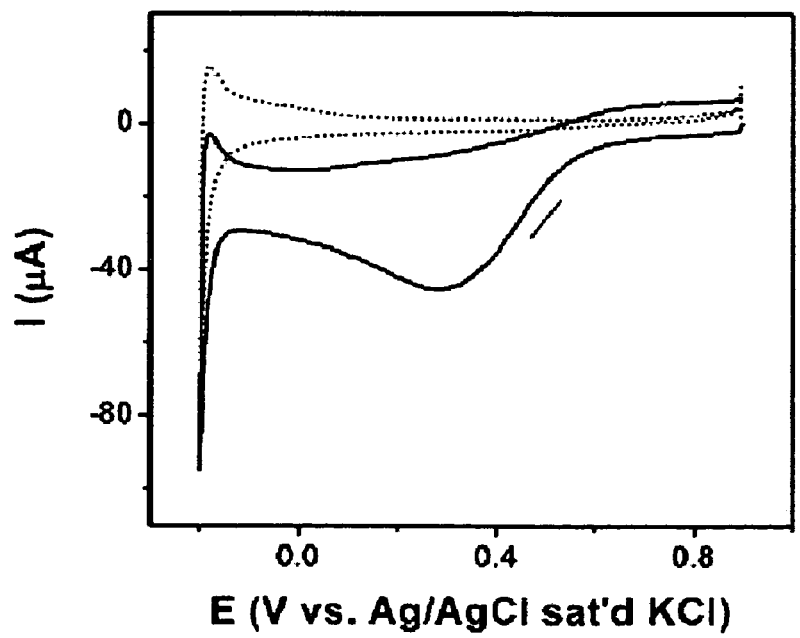

2. AuPt/C. FIGS. 9a and 9b show a typical set of CV curves obtained at $Au_{81}Pt_{19}$/C catalyst (24% wt metals) in both alkaline (FIG. 9a), and acidic (FIG. 9b), electrolytes. There are two important pieces of evidence supporting the presence of both Au and Pt on the surface of the nanoparticle catalyst. First, similar to the CV curve for the Au/C catalyst in the absence of oxygen (FIG. 7a, dashed line), the observation of the oxidation-reduction wave of gold oxide at ~200 mV at the $Au_{81}Pt_{19}$/C catalyst in the $O_2$-free alkaline electrolyte (FIG. 9a, dashed line) is a clear indication of the presence of Au on the catalyst. Second, the observation of the hydrogen reduction-oxidation currents at −200 mV in the $O_2$-free acidic electrolyte, which is characteristic of hydrogen adsorption and reduction at Pt electrodes, is strong evidence for the presence of Pt on the catalyst surface.

In comparison with the data for Au/C catalysts, there are two important observations for the electro-catalytic activity of the AuPt nanoparticle catalysts. First, the ORR wave at the $Au_{81}Pt_{19}$/C catalyst is observed at about the same potential (+190 mV) as that for the Au/C in the alkaline electrolyte. Note also that a very small wave is detectable at −450 mV for the AuPt/C catalyst. Second, the ORR waves are highly dependent on the nature of the electrolyte. This wave for $Au_{81}Pt_{19}$/C is observed at +350 mV in the acidic electrolyte, which is much more positive than that for the Au/C (+50 mV) in the same electrolyte. In this case, the ORR currents detected at below +50 mV are characteristic of hydrogen adsorption-reduction at Pt electrodes. The result thus suggests that there is a significant fraction of Au on the bimetallic catalyst which keeps the nanoscale gold property unchanged in basic condition, but modifies the catalytic property of Pt in the acidic electrolyte.

Figure 10A:
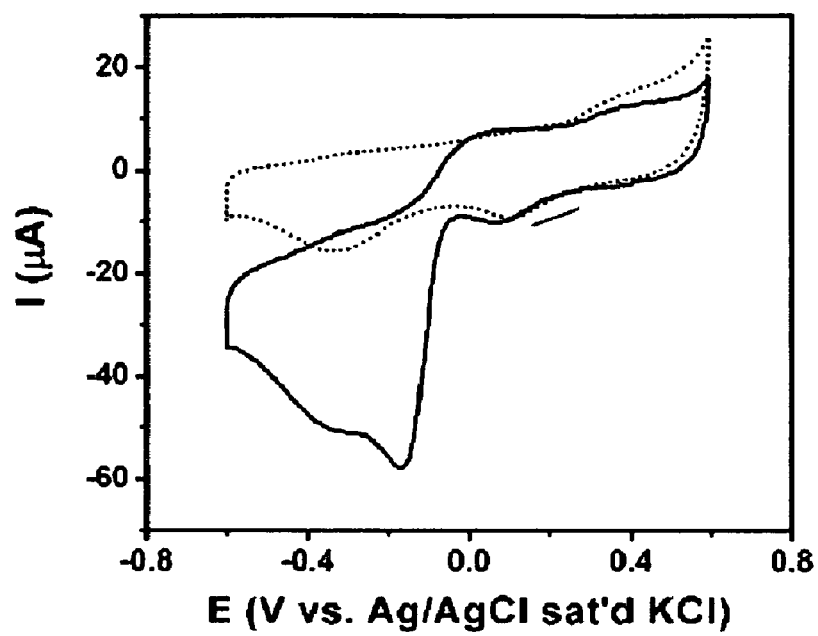
FIGS. 10a and 10b are cyclic voltammetric curves for a $Au_{68}Pt_{32}$/C catalyst (39% wt) on GC electrode (0.07 $cm^2$) in alkaline (A, 0.5 M KOH) and acidic (B, 0.5 M $H_2SO_4$) electrolytes saturated with $O_2$ (solid curves) and Ar (dash curves). Scan rate: 50 mV/s.
Figure 10B:
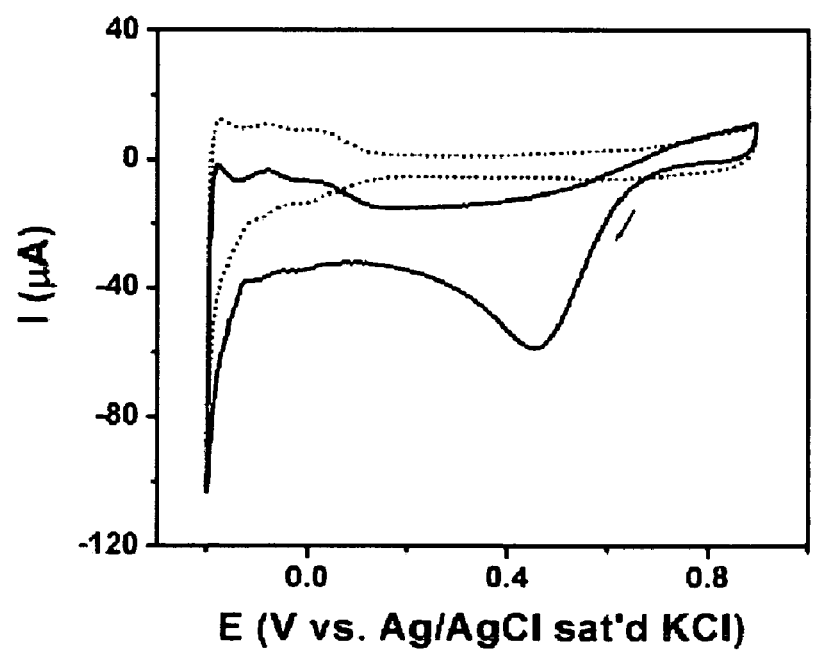

The dependence of the electro-catalytic activity on the relative bimetallic composition of the catalyst was further examined. FIGS. 10a and 10b show a typical set of CV curves obtained at $Au_{81}Pt_{32}$/C catalyst (39% wt metals) in both alkaline (FIG. 10a), and acidic (FIG. 10b), electrolytes. Note that the metal loading is somewhat higher than that in the previous case (~20% wt metals).

Two important changes are evident. First, while the ORR peak potential at −190 mV remains largely unchanged, a significant wave component of the ORR is evident at −400 mV in the alkaline electrolyte, which showed an increase for the $Au_{68}Pt_{32}$/C in comparison with that for the previous $Au_{81}Pt_{19}$/C. Second, the ORR wave for the $Au_{68}Pt_{32}$/C showed a shift of the peak potential to a much more positive potential (~+500 mV) than that for the $Au_{81}Pt_{19}$/C in the acidic electrolyte. Both findings suggest that the electro-catalytic activity of Au and Pt metal components in the nanoparticle catalysts is dependent on the nature of the electrolyte. It appears that the catalysis at the individual Au or Pt surface site is operative in the alkaline electrolyte, whereas the catalysis of the bimetallic surface sites is operative in the acidic electrolyte.

Figure 11A:
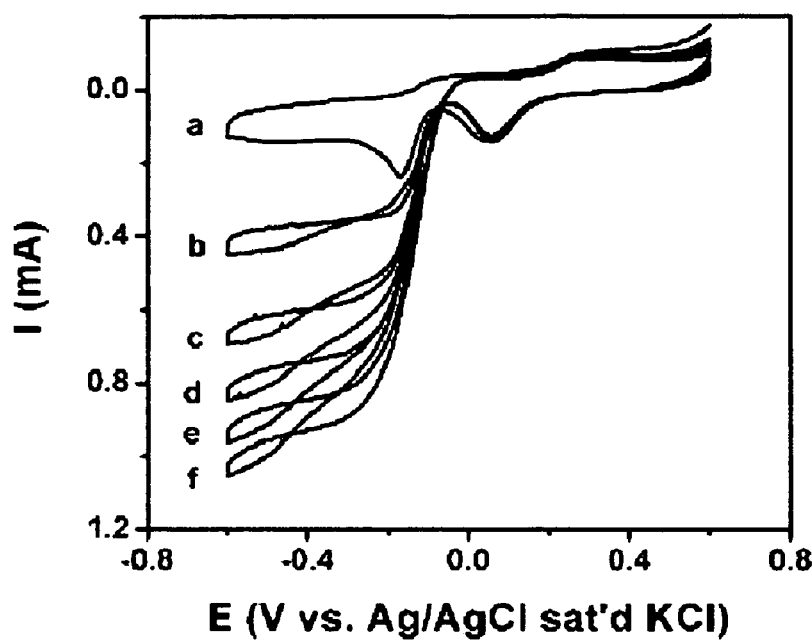
FIGS. 11a and 11b are RDE curves for a $Au_{81}Pt_{19}$/C catalyst (24% wt) on GC electrode (0.2 $cm^2$) in alkaline (11a, 0.5 M KOH) and acidic (11b, 0.5 M $H_2SO_4$) electrolytes saturated with $O_2$. (Rpm: (a) 0; (b) 500; (c) 1500; (d) 2500; (e) 3500; (f) 4500. Scan rate: 10 mV/s)
Figure 11B:
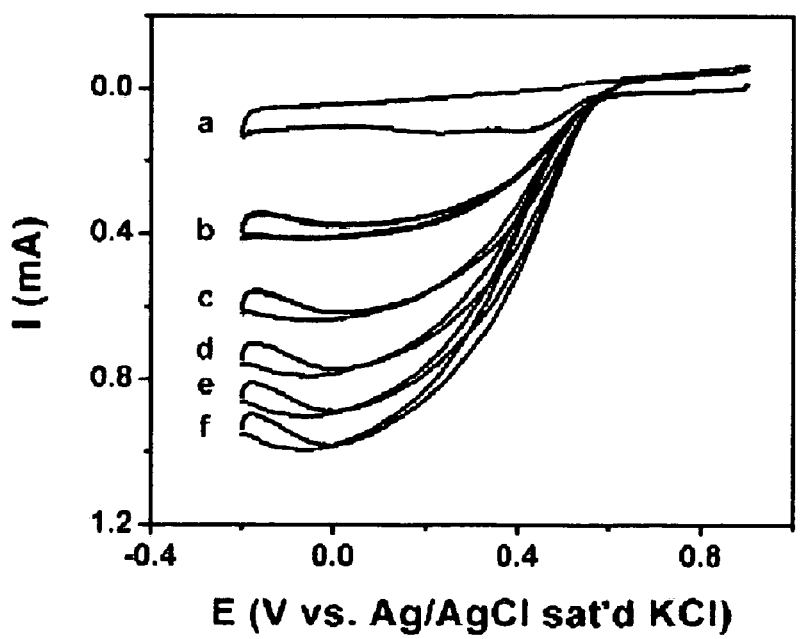

To further evaluate the electro-catalytic properties, rotating disk electrode (RDE) experiments were performed to characterize the number of electrons transferred in the electro-catalytic ORR process. FIGS. 11a and 11b show a typical set of RDE data obtained for ORR at $Au_{81}Pt_{19}$/C-catalyst (24% metal loading) in both alkaline (FIG. 11a), and acidic (FIG. 11b), electrolytes.

Figure 12A:
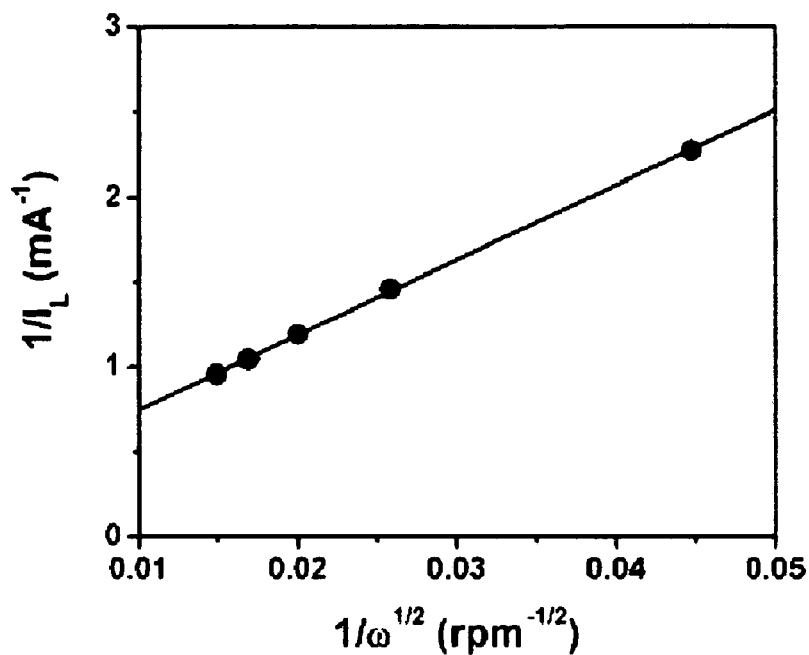
FIGS. 12a and 12b are Levich plots of the limiting current ($I_L$) for a $Au_{81}Pt_{19}$/C catalyst (24% wt) on GC electrode (0.2 cm²) in alkaline (12a, 0.5 M KOH) and acidic (12b, 0.5 M $H_2SO_4$) electrolytes saturated with $O_2$, shown in FIGS. 11a and 11b.
Figure 12B:
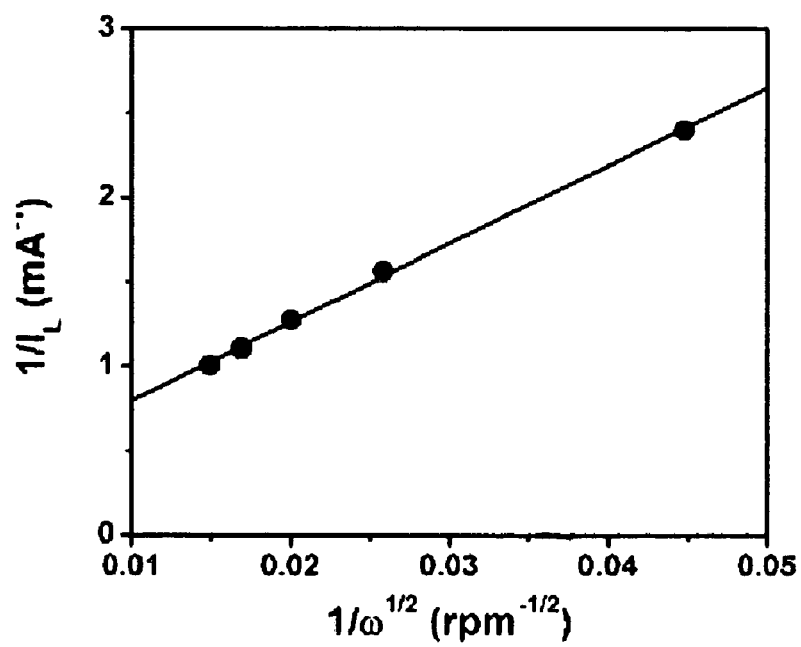

From Levich plots, FIGS. 12a and 12b, one derives the value for the electron transfer number (n). The electron transfer number obtained was n=3.6 in 0.5 M KOH (FIG. 12a), and n=3.4 in 0.5 M $H_2SO_4$ (FIG. 12b), (~±0.4 error bar) for ORR at the $Au_{81}Pt_{19}$/C catalyst. There is a noticeable increase in the n value for the bimetallic AuPt/C catalyst in comparison with that for the monometallic Au/C catalyst.

3. Comparison of Electro-catalytic activities. Comparing now the above electrochemical data for Au/C and AuPt/C catalysts with those from commercially-available catalysts, E-TEK's Pt/C (20% metals) and PtRu/C (20% metals) catalysts, analysis was performed of electro-catalytic ORR data obtained with commercially available Pt/C catalysts (20% metals) in both alkaline and acidic electrolytes. In the alkaline electrolyte, the reduction wave at Pt/C is small at −190 mV, but predominant at −400 mV. In the acidic electrolyte, the reduction wave at Pt/C is at +550 mV, about 100–200 mV more positive than the AuPt/C catalyst. The currents detected at below +50 mV are characteristic of hydrogen adsorption and reduction at Pt electrodes. For electro-catalytic ORR with the commercially available PtRu/C catalysts (20% metals), the reduction peak potential at PtRu/C is shifted negatively by 50–100 mV, consistent with the fact that the PtRu/C catalyst is less active than that for Pt/C catalyst.

To ensure that the quantity of catalysts falls in a linear region, a comparison was made of CV data with different catalyst quantities on the electrode surface. The close linearity between peak current and catalyst quantity, and the absence of a significant potential shift with different catalyst loading thus ensure the validity of the above catalytic comparison. Similar results have also been observed for the other catalysts tested. Table 2 summarizes several sets of electro-catalytic data to quantitatively compare ORR activities for different catalysts.

The Levich plot analysis of the RDE data for the ORR at E-TEK's Pt/C catalyst (20% wt) in acidic electrolyte revealed n=4.0±0.2, consistent with a 4e$^-$ process for the reduction of $O_2$ to $H_2O$ at the Pt catalyst. Similar results have also been obtained for ORR in the alkaline electrolyte. In comparison with the Pt/C data, the n values obtained with Au/C and AuPt/C catalysts are in between 3.0~3.6, displaying an increase of n with increasing Pt composition in the bimetallic nanoparticles. The fact that the obtained n values fall in between n=2 and =4 likely suggests that both 2e$^-$ reduction to $H_2O_2$ and 4e$^-$ reduction to $H_2O$ processes are operative with the catalysts.

CONCLUSION

The initial results have indicated that the bimetallic AuPt composition can significantly modify the electro-catalytic properties for the MOR reaction. The above electrochemical

TABLE 2

Comparison of ORR (saturated $O_2$) reduction peak potential ($E_{pc}$) and current ($i_{pc}$).

| Catalyst | Wt % Mt | $M_1$:$M_2$ | 0.5 M KOH | | 0.5 M $H_2SO_4$ | |
|---|---|---|---|---|---|---|
| | | | $E_{pc}$ mV | $i_{pc}$ (mA/cm$^2$/mg Mt) | $E_{pc}$ mV | $i_{pc}$ (mA/cm$^2$/mg Mt) |
| Pt/C$^{(E)}$ | 20% Pt | | −184 & −383 | 2125 & 3464 | +550 | 1821 |
| PtRu/C$^{(E)}$ | 20% PtRu | PtRu | −266 & −433 | 2357 & 2116 | +425 | 1155 |
| Au/C | 17% Au | | −145 | 1744 | −23 | 903 |
| AuPt/C | 24% AuPt | $Au_{81}Pt_{19}$ | −135 | 1147 | +280 | 677 |
| AuPt/C | 39% AuPt$^{a)}$ | $Au_{68}Pt_{32}$ | −172 & −323 | 530 & 467 | +454 | 540 |

Electrode coverage: 57 μg catalyst/cm$^2$; Electrode area: 0.07 cm$^2$; Scan rate: 50 mV/s; Ref electrode: Ag/AgCl, Sat'd KCl. Note:

The comparison of these electro-catalytic data with different bimetallic compositions and metal loading, provides important information for an initial assessment of the catalytic activity of the AuPt catalysts. There are two important findings from comparing the peak potentials and peak currents. First, in the alkaline electrolyte, the ORR peak potentials at the Au/C and AuPt/C catalysts with >60 Au % are slightly less positive than that for the Pt/C, and slightly more negative than that for the PtRu/C catalysts. This finding suggests that their activities are largely comparable. On the other hand, the peak current density for the AuPt, after being normalized to the total metal loading (which serves as a measure of the turnover number for the catalytic activity), is either comparable or slightly smaller than the commercially available catalysts by a factor of ~2. The data are indicative of a better or comparable catalytic activity for the Au/C and AuPt/C catalysts than for the Pt/C or PtRu/C catalysts in the alkaline electrolyte.

Second, significant changes in catalytic activities are evident for the AuPt/C catalysts in the acidic electrolyte. From Table 1, there is a major positive shift of peak potential upon introducing Pt in the bimetallic catalyst. The peak potential is slightly lower than those for the Pt/C and PtRu/C catalysts, depending on the relative Pt composition in the bimetallic nanoparticle. The peak current is largely comparable to those observed for the Pt/C and PtRu/C catalysts. Therefore, the bimetallic AuPt composition played a significant role in the modification of the electro-catalytic ORR activity.

results have indicated that the bimetallic AuPt composition can significantly modify the electro-catalytic ORR properties of both Au and Pt. This finding has important implications, demonstrating effective catalysts for improving fuel cell cathode reactions. The catalytic activity is highly dependent on the composition and calcination. Au and AuPt nanoparticle catalysts have been demonstrated to be viable fuel cell catalysts under a number of conditions.

Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Having thus described the invention, what is desired to be protected by Letters Patent is presented in the subsequently appended claims.

What is claimed is:

1. A bifunctional fuel cell catalyst comprising highly monodisperse, core-shell nanoparticles of gold/platinum (AuPt) alloy supported upon an electrically conductive, non-metallic particulate substrate.

2. The bifunctional fuel cell catalyst in accordance with claim 1, further comprising an electrically conductive, non-metallic particulate substrate chosen from the group carbon black (C), and C/TiO$_2$.

3. The bifunctional fuel cell catalyst in accordance with claim 1, wherein said nanoparticles of AuPt alloy have have an average diameter of between approximately 1 and 5 nanometers and a monodispersity less than approximately ±0.6 nm.

4. The bifunctional fuel cell catalyst in accordance with claim 1, wherein said AuPt alloy comprises a composition having a selectively controllable Au/Pt ratio ranging between 1:99 and 99:1.

5. The bifunctional fuel cell catalyst in accordance with claim 1, wherein said AuPt alloy has a composition ranging between 50:50 and 80:20.

6. A cathode for a fuel cell comprising the catalyst in accordance with claim 1.

7. An anode for a fuel cell comprising the catalyst in accordance with claim 1.

8. A method of fabricating bifunctional fuel cell catalysts, comprising the steps of:
   a) mixing a solution of Au salts and a solution of Pt salts;
   b) reducing metal salts in said solution using a reducing agent in the presence of an organic capping agent to form AuPt alloy core-shell nanoparticles comprising AuPt alloy cores encapsulated in organic shells;
   c) assembling said AuPt alloy core-shell nanoparticles upon an electrically conductive non-metallic particulate support; said support chosen from at least one of the group: carbon black and carbon black (C) /TiO2 substrate;
   d) removing said organic shells; and
   e) activating said AuPt alloy nanoparticles by at least one of the processes selected from the group: a thermal calcination or treatment process, and an electrochemical oxidation or reduction process.

9. The method of fabricating bifunctional fuel cell catalysts in accordance with claim 8, wherein said preparing AuPt alloy nanoparticles step (a) further comprises using a specific ratib of said solution of Au salts and said solution of Pt salts.

10. The method of fabricating bifunctional fuel cell catalysts in accordance with claim 8, wherein said preparing AuPt alloy nanoparticles step (a) further comprises using a phase transfer reagent and an aromatic hydrocarbon suspension liquid.

11. The method of fabricating bifunctional fuel cell catalysts in accordance with claim 10, wherein said phase transfer reagent comprises tetraoctylammonium bromide.

12. The method of fabricating bifunctional fuel cell catalysts in accordance with claim 8, wherein said assembling said AuPt alloy nanoparticles step (c) further comprises controlling the size of said AUPt alloy nanoparticles by molecularly mediated assembly with an organic material.

13. The method of fabricating bifunctional fuel cell catalysts in accordance with claim 8, wherein said assembling of said AuPt alloy nanoparticles step (c) further comprises controlling the size of said AuPt alloy nanoparticles by molecularly mediated assembly, and capping with an organic material, wherein said organic material is chosen from the group a thiol, a carboxylic acid, and an amine compound.

14. The method of fabricating bifunctional fuel cell catalysts in accordance with claim 8, wherein said assembling of said AuPt alloy nanoparticles step (c) further comprises controlling the size of said AuPt alloy nanoparticles by molecularly mediated assembly with an organic material, wherein said organic material is chosen from the group decanethiol, and oleylamine.

15. The method of fabricating bifunctional fuel cell catalysts in accordance with claim 8, wherein said assembling of said AuPt alloy nanoparticles step (c) further comprises controlling the size of said AuPt alloy nanoparticles by molecularly mediated assembly with an organic material, and further comprising the gradual addition of an excess of aqueous sodium borohydride.

16. The method of fabricating bifunctional fuel cell catalysts in accordance with claim 8, wherein said preparing AuPt alloy nanoparticles step (a) further comprises controlling the size and composition of said AuPt alloy nanoparticles by a cleaning procedure.

17. The method of fabricating bifunctional fuel cell catalysts in accordance with claim 8, wherein said activating said AuPt alloy nanoparticles by thermal activation means step (d) further comprises shell removal by heating in a controlled temperature and atmosphere for a first specified duration, and calcination at a controlled temperature and atmosphere for a second specified duration.

18. The method of fabricating bifunctional fuel cell catalysts in accordance with claim 17, wherein said shell removal controlled temperature is in the range of 200 to 300°C., said shell removal atmosphere is 20% $O_2/N_2$, and said shell removal duration is approximately 1 hour; and wherein said calcination controlled temperature is in the range of 300 to 600° C., said calcination controlled atmosphere is 15% $H_2/N_2$, and said calcination controlled duration is approximately 2 hours.

19. A cathode for a fuel cell comprising the catalyst produced by the method in accordance with claim 8.

20. An anode for a fuel cell comprising the catalyst produced by the method in accordance with claim 8.

* * * * *